United States Patent [19]
Jones et al.

[11] Patent Number: 5,649,596
[45] Date of Patent: Jul. 22, 1997

[54] USE OF BREAKER CHEMICALS IN GELLED HYDROCARBONS

[75] Inventors: C. K. Jones, Houston, Tex.; R. D. Lundberg, Williamsburg, Va.; F. Malekahmadi, Houston, Tex.

[73] Assignee: Nalco/Exxon Energy Chemicals, L.P., Sugarland, Tex.

[21] Appl. No.: 607,861

[22] Filed: Feb. 27, 1996

[51] Int. Cl.$^6$ .......................... E21B 43/26; E21B 43/267
[52] U.S. Cl. .......................... 166/300; 166/308; 507/231; 507/238; 507/269; 507/921; 507/922
[58] Field of Search .................................. 166/300, 308; 507/221, 231, 238, 269, 921, 922

[56] References Cited

U.S. PATENT DOCUMENTS

| | | |
|---|---|---|
| 2,687,175 | 8/1954 | Johnson ................ 507/269 X |
| 2,966,401 | 12/1960 | Myerholtz, Jr. ................ 507/231 X |
| 3,163,219 | 12/1964 | Wyant et al. . |
| 3,990,978 | 11/1976 | Hill ................ 507/921 X |
| 4,147,677 | 4/1979 | Lundberg et al. . |
| 4,157,432 | 6/1979 | Lundberg et al. . |
| 4,442,011 | 4/1984 | Thaler . |
| 4,506,734 | 3/1985 | Nolte ................ 166/308 |
| 4,622,155 | 11/1986 | Harris et al. ................ 166/308 X |
| 4,741,401 | 5/1988 | Walles et al. ................ 166/300 |
| 4,795,574 | 1/1989 | Syrinek et al. ................ 166/308 X |
| 4,877,894 | 10/1989 | Huddleston ................ 507/238 X |
| 5,102,559 | 4/1992 | McDougall et al. . |
| 5,110,486 | 5/1992 | Manalastas et al. ................ 166/308 X |
| 5,217,074 | 6/1993 | McDougall et al. ................ 166/300 |

*Primary Examiner*—George A. Suchfield
*Attorney, Agent, or Firm*—R. L. Graham

[57] ABSTRACT

Oil degradable granules containing particulate breaker chemical is used in fracturing operations to break hydrocarbon liquid gelled with salts of alkyl phosphate esters. The preferred breaker chemical is powdered $Ca(OH)_2$.

17 Claims, No Drawings

USE OF BREAKER CHEMICALS IN GELLED HYDROCARBONS

FIELD OF THE INVENTION

The present invention relates generally to the treatment of subterranean formations using gelled hydrocarbons. In one aspect, it relates to the use of breaker chemicals in gelled oil-base fracturing fluids. In another aspect, the invention relates to the use of granules containing breaker chemicals in fracturing operations.

DESCRIPTION OF THE PRIOR ART

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of a vertical, high-conductivity channels through which fluids can thereafter be injected or produced. The conductivity in the propped fracture is a function of the fracture dimensions and the permeability of the bed of propping agent particles within the fracture.

In order to generate the fracture of sufficient length, height, and width and to carry the propping agent particles into the fracture, it is necessary for the fluid to have relatively high viscosity. This requires the use of gelling agents in the fracturing fluid.

Fracturing fluids are water-based systems (gelled with water soluble polymers) or oil-based liquids (gelled with in-situ formed reversible networks). The water-based liquids cannot be used in the fracturing of many water sensitive formations. Fracturing in these formations requires the oil-based liquids.

As with all fracturing fluids, the gel or viscosity of the fracturing fluid must be retained for sufficient time to generate the fracture and place the proppant therein, but must eventually be "broken" to permit the well to cleanup. The fracturing fluid accordingly will generally incorporate a "delayed breaker" which, after a predetermined time or event, activates the breaker to degrade the polymer or gelling agent. Water-based "breakers" are described in SPE Paper 18862. Breakers for oil-based systems are more varied because of the differences in the hydrocarbon viscosifier.

The breaker used in accordance with the present invention is for pH sensitive oil-based gelling agents. By far the most common gelling agents which exhibit pH sensitivity are the phosphate gelling agents. These well known and commercially available gelling agents for oil-based systems are alkyl phosphate esters.

Breaker chemicals useful in oil-based systems include sodium bicarbonate (U.S. Pat. No. 4,877,894), calcium hydroxide, and magnesium hydroxide, and similar bases.

The breaker chemicals may be encapsulated and activated by a variety of mechanisms including crushing by formation closure (U.S. Pat. No. 4,506,734), and dissolution by formation fluids (U.S. Pat. No. 4,741,401 and U.S. Pat. No. 5,110,486). U.S. Pat. No. 3,163,219 discloses water-insoluble agents such as rosin asphalts and waxes used as binding agents for sulfur and calcium sulfate gel breakers for water-based systems.

SUMMARY OF THE INVENTION

The method of the present invention involves the use of granules containing a particulate gel breaker which are introduced into an oil-based fracturing fluid and function as delayed breakers in the fracturing operations. The granules exhibit a delayed release of the active chemical (gel breaker) so the degradation or the breaking down of the gelled structure occurs well after the fracturing fluid has been pumped into the formation. Moreover, the breakers are effective within reasonable time periods so that long shut-in times are not required.

The preferred gelling agents for the oil-based liquids are the metal salts of alkyl or orthophosphate esters. These gelling agents are effective viscosifiers in a wide range of oil types, and are most effective when neutralized (i.e. no excess presence of base or acid). In the presence of excess base or acid, the gelled structure is destroyed and the viscosity of the fracturing hydrocarbon is reduced. Acids and bases thus can be used to break the phosphate ester gelling agents. The present invention relies on this mechanism for breaking gels, and employs granules containing the base or acid.

The granules comprise an oil-degradable rubber matrix having particulate, acid, anhydride, or base distributed therein.

In a preferred embodiment, the granules comprise
10 to 90 wt % of an oil degradable rubber, and
10 to 90 wt % of particulate base such as $Ca(OH)_2$
0 to 50 wt % of inert particles such as diatomaceous earth.

It is preferred that the particulates (base and inert filler) comprise at least 50 wt % of each granule. In the most preferred embodiment the particulate base will comprise at least 50 wt % of each granule.

The rubber granules must have a particle size range suitable for fracturing operations. The base is dispersed throughout the rubber matrix and is released by the rubber degrading in contact with oil. The degradation preferably is the result of the rubber dissolving or dispersing in the oil fracturing fluid or formation fluid (oil). The rubber thus preferably is oil soluble or dispersible to a degree.

The preferred rubber is substantially amorphous ethylene-propylene-diene monomers (EPDM) terpolymer, ethylene-propylene copolymer, polyisobutane (PIB) or a mixture of these.

The base is preferably finely divided (i.e. powdered) chemical and includes $CA(OH)_2$, urea, sodium bicarbonate, Mg carbonate, and sodium carbonate, and mixtures of these. The preferred base is powdered $Ca(OH)_2$.

The granules are manufactured by charging the components [e.g. rubber and $Ca(OH)_2$], to a mechanical mixer and blending the components until the $Ca(OH)_2$ particles are uniformly distributed in the rubber matrix. The mass is then ground to the proper particle size for use [(e.g. 30 mesh or less and preferably between about 30 to 50 mesh U.S. Sieve Series)].

Although the concentration of the powdered base in the rubber may range within a wide range as indicated above, it is preferred that the base comprise at least 40 wt % and most preferably at least 50 wt % of the granule. It has been found that this high particle loading reduces the tackiness of the rubber, improving flowability and storage.

The rubber matrix physically stabilizes the powder so that handling of the granules presents no debris or "fly" problems in granule handling and use.

In operations, the granules are introduced into the gelled oil-base fracturing fluid and pumped down the well and into the formation. The $Ca(OH)_2$ is shielded from the gelled hydrocarbon by the rubber during pumping operations. However, with time and with formation temperature, the oil degrades (e.g. disperses) the rubber, exposing the $Ca(OH)_2$ powder. The $Ca(OH)_2$ disrupts the neutralized hydrocarbon causing the gelled structure to break, reducing the viscosity of the oil.

The oil gelled with phosphate ester gelling agents are effective in the absence of excess base or acid. This requires the apparent pH of the liquid to be in the neutral range. In adding the gelling agent to the oil, the pH need not be measured because sufficient gelling of the oil inherently requires the absence of excess base or acid.

The addition of the base or acid provides an excess base or acid to break the gelled structure.

DESCRIPTION OF THE PREFERRED EMBODIMENTS

The present invention is described and exemplified in connection with the preferred embodiments,—the use of a base chemical dispersed in rubber granules for breaking alkyl phosphate ester gelling agents. It is to be understood, however, that the invention in its broadest concept contemplates the use of acids or bases dispersed in the rubber granules. The preferred embodiment is described with specific references to (a) the type of liquid to be gelled, (b) the gelling agent, (c) the "breaker" granules, and (d) operations.

(a) Liquid

The hydrocarbon liquid for the fracturing fluid may be any of those currently used in such operations. These include crude oil, refined oil, diesel oil, fuel oil, condensates, and the like. Because of low cost and availability, crude oil and diesel oil are the most common oils used in oil-based fracturing systems.

(b) Gelling Agent

As indicated above, the gelling agent must be capable of increasing the viscosity of the oil and must be pH sensitive. That is, the viscosity increase is optimum at or near neutral acidity. The addition of base "breaker" chemical will provide excess base which causes the gelling agent to degrade, destroying its network structure in the oil. This returns the oil to a low viscosity (ungelled) state, permitting well cleanup.

The metal salts of partially esterified phosphates are known to be pH sensitive gelling agents. See, for example, U.S. Pat. No. 4,877,894 which discloses a commercial alkyl phosphate acid-ester marketed as "ASP-160", by Nalco Chemical Company (now NALCO/EXXON ENERGY CHEMICALS, L. P.). This patent also discloses an improved alkyl phosphate ester geller and a delayed "breaking agent" (sodium bicarbonate). The disclosure of U.S. Pat. No. 4,877, 894 is incorporated herein by reference.

Specific alkyl phosphate ester gelling agents include $C_{3-18}$ (preferably $C_{6-10}$) alkyl diester acids, $C_{8-10}$ alkyl diester acid, mixtures of the above, and analogous mono and diesters. These additives are known in the industry, and many are commercially available. The gelled structure in the oil is developed by mixing the alkyl phosphate ester with a basic aluminum component such as sodium aluminate, selected aluminum alkoxides, and aluminum acetate. Sodium aluminate is the preferred base compound.

One method for making alkyl phosphate esters or diesters involves reacting aliphatic alcohols having from 3 to 18, (preferably 6 to 10) carbon atoms with phosphorous pentoxide. The phosphate intermediate then may interchange its ester groups with triethyl phosphate with triethyl phosphate producing a more broad distribution of alkyl phosphate esters.

(c) Granules

The granules may be compounded from two main ingredients: (1) rubber and (2) a particulate or powdered alkaline compound (base).

The rubber may be natural or synthetic and must possess the following properties:

(i) capable of being compounded or mixed with the particulate base to produce free-flowing, substantially non-tacky granules, (ii) sufficiently oil degradable to cause the granule to release the basic compound after a preselected delay time following fracturing fluid placement.

The preferred rubbers (or elastomers) generally will be selected from the following different chemical classes: ethylene propylene-diene monomer (EPDM), ethylene-propylene copolymer (EPR), polyisobutene (PIB), Butyl rubber (a copolymer of isobutylene and isoprene), styrene-butadiene copolymer (also known as SBR rubber), block polymers of styrene and butadiene or isoprene (which can be hydrogenated or non hydrogenated) offered by Shell Chemical Co. under the KRATON trademark, polybutadiene, polyisoprene and blends of these. It is readily understood in the art that these polymers are comprised of different molecule weight molecules so that there is a wide distribution of molecular weights. This is often characterized by molecular weight distribution ratios such as the ratio of Weight to Number average. This invention includes those polymers of said ratios of from >1.0 to 10. Those preferred elastomers are classified as AA by ASTM D2000-SAE J200 indicating low resistance to oil. (Unless otherwise indicated, molecular weights are number average molecular weights.)

A description of these elastomers is provided in The Kirk Othmer Concise Encyclopedia of Chemical Technology, published by John Wiley & Sons, 1985, page 391 forward, the disclosure of which is incorporated herein by reference.

Unlike most of the other high molecular weight polymers contemplated in this invention, PIB is a low molecular weight polymer primarily prepared from isobutylene. Due to the raw materials employed, it also often contains other comonomers such as butene-1, and butene-2; however, the major component is isobutylene. This oligomer typically ranges in number average molecular weight from 300 to 10,000, and is used commercially in a variety of applications such as an important raw material for motor oil additives.

The most preferred rubbers are EPDM and mixtures of EPDM and PIB.

Most of the EPDM elastomers are terpolymers containing from 40 to 90 mole percent of ethylene, from 20 to 70 mole percent of propylene, and from 1 to 20 mole percent of the diene monomer. The dienes include 5-ethylidene-2-norbornene, 1,4-hexadiene, 5-phenyl-2-norbornene and dicyclopentadiene. As stated in the *ENCYCLOPEDIA OF POLYMER SCIENCE AND ENGINEERING*, Vol. 6, pp. 522–523, ethylene-propylene elastomers are made from the basic building blocks of ethylene and propylene and may be combined with a third, or even a fourth, monomer to provide the olefinic sites along the backbone. The term "EPDM elastomers" includes terpolymers and tetrapolymers that include at least monomers of ethylene, propylene, and diene. The preferred EPDM elastomers (ethylene/propylene/5-ethylidene-2-norbornene) have about 0.5 to about 20 wt % 5-ethylidene-2-norbornene monomer, about 30 to 70 wt % ethylene, with the balance of the polymer being propylene. A typical ethylene/propylene/5-ethylidene-2-norbornene terpolymer has an ethylene content of about 50 wt % and a 5-ethylidene-2-norbornene content of about 5 wt %. The terpolymers useful in the present invention have a number average molecular weight ($M_n$), as measured by GPC, of about 40,000 to about 300,000, more preferably of about 100,000 to about 300,000, and most preferably of about 200,000 to about 300,000. All polymer molecular weights quoted herein are number average molecular weights unless otherwise indicated. The Mooney viscosity (ML 1+8, 100° C.) of the terpolymer is about 5 to about 90, more preferably of about 10 to about 80 and most preferably about 20 to about 80. The EPDM should have a low crystallinity (<50%) and preferably less than 30%. The degree of crystallinity and molecular weight ranges are particularly important. Medium to low crystallinity is preferred because these polymers require less energy to reach a flux state during mixing. EPDM terpolymers useful in the present invention are commercially available in a variety of grades from a number of manufacturers, including Exxon, Uniroyal, Dupont, DSM Copolymer, and Polysar to name a few.

The EPDM may be used alone or blended with other rubbers such as PIB. When using PIB as the main rubber component, the PIB will have a molecular weight of 100,000 to about 2 million, preferably 500,000 to 1 million. When using PIB as a supplement with another rubber such as EPDM, the liquid form of the PIB having a molecular weight of 300 to 10,000 may be used. The high molecular weight PIB appears to retard release of the base since it dissolves slowly in the oil.

The base may be any finely divided compound capable of being dispersed in the rubber and capable of disrupting the network structure of the gelling agent. The base preferably should have a particle size of less than 1,000 microns and most preferably less than 500 microns (powder). The preferred bases are powder $Ca(OH)_2$, finely divided urea, MgO, and $NaHCO_3$, with $Ca(OH)_2$ being the most preferred.

The granules are prepared by compounding or mixing the rubber and the finely divided base to uniformly disperse the latter in the former.

A wide variety of machines are available in the plastics and rubber industry for mixing, with varying degrees of shear (from about 10 sec$^{-1}$ to greater than about 1000 sec$^{-1}$) resinous and elastomeric materials with solid or liquid reagents under controlled conditions of temperature, mechanical pressure and atmosphere. The equipment used for mixing the EPDM with the base, whether done in a batch, semi-continuous, or fully continuous process, must exert sufficient shear at the temperature of operation in order to ensure dispersion of the base particles in the rubber.

Preferably, the mechanical mixing device is a Banbury mixer or similar mixer equipped with helical sigma blades rotating in the opposite direction or a Bramley Beken blade mixer, to name a few of the mechanical mixers commercially available in the plastics and rubber industries.

The mass discharged from the mixer is then ground to the proper mesh size for use in the fracturing fluid. A wide variety of suitable grinders are commercially available. The final granules are non-tacky and comprise a rubber matrix with the base particles distributed therein. At the preferred loadings of the finely divided base, the granules exhibit the flowability and non-tackiness of the base material.

The composition of the granules, of course, will be tailored for specific applications to meet the needs of the treatment. The following are representative ranges and constituents of the granules:

|  | Wt % Broad Range (Wt %) | Preferred Range (wt %) | Most Preferred Range (Wt %) |
|---|---|---|---|
| Rubber: |  |  |  |
| EPDM | 10 to 90 | 20 to 60 | 20 to 50 |
| PIB | 0 to 10 | 0 to 10 | 0 to 10 |
| Base: |  |  |  |
| Powdered $Ca(OH)_2$ | 10 to 90 | 40 to 80 | 50 to 80 |

The granules may contain other additives such as extenders. Suitable extenders are inert finely divided material such as fussorial earth (diatomaceous earth), silica flour, talc and the like.

Following the grinding step, the particles may be classified by size (20 mesh or smaller, preferably 30 mesh or smaller, U.S. Sieve Series) for the contemplated system. However, this step may not be necessary because the grinding can be controlled to provide the proper size distribution.

(d) Operations

In carrying out the fracturing operations, the gelling agent, liquid hydrocarbons, basic aluminum compounds, solid additives (proppants), and breaker granules are blended in frac tanks at the well site, by either a batch, semi-continuous or continuous process to produce the gelled hydrocarbon. Once the fracturing operations are begun, the gelled hydrocarbon suspension is pumped from the frac tanks and pumped down the well bore at the desired formation fracturing pressure and out into the formation fracture. The target formation may be kept under elevated pressure for up to several hours to promote further propagation of cracks. Therefore, it is desirable that the gelled hydrocarbon viscosity remain stable in the temperature range of about 0°–10° F. to about 150° F. for several hours.

Once the fracturing operation is complete, the pressure on the hydraulic fracturing fluid is released. The hydrocarbon liquid or formation fluids degrade (i.e. dissolve or disperse) the rubber matrix exposing the breaker chemical to the gelled hydrocarbon. The time of delay, of course, will depend on several factors, including oil solubility or dispersibility of the rubber matrix, temperature, loading of the breaker chemical in the granules, and the effect of the breaker chemical on the gelled structure.

Normally the treatment should be designed to provide a delay of from 8 to 24 hours beginning with their introduction into the frac fluid. Note that the effect of the breaker chemical may commence earlier (e.g. one hour after introduction into the fluid) but will only gradually reduce the viscosity of the frac fluid over the design delay period.

The total amount of the breaker chemical incorporated within the granules will primarily depend on the loading of gelling agent, as well as other design considerations.

The following represents a typical oil-based treating liquid system of the present invention:

|  | Concentration in the Oil | |
|---|---|---|
|  | Preferred | Most Preferred |
| Phosphate ester gelling agent | 5–30 gptg[1] | 7–15 gptg |

-continued

|  | Concentration in the Oil | |
|---|---|---|
|  | Preferred | Most Preferred |
| sodium aluminate | 1–10 gptg | 1–3 gptg |
| Breaker[3] granules | 1–20 pptg[2] | 5–10 pptg |

[1]gallons per thousand gallons
[2]pounds per thousand gallons
[3]particles containing from 50 to 80 wt % Ca(OH)$_2$ Alternate Embodiment The present invention has been described in detail in connection with alkaline breaker chemicals. As noted above, the same principles and mechanisms are involved when using excess acid or acid anhydride breaker chemicals in the granules. Finely-divided acid or acid anhydrides can be compounded with the rubber to form granules having the acid or acid anhydride dispersed therein in the manner described above.

Suitable acid or acid anhydride chemicals capable of breaking the alkyl phosphoric gelling agents include $C_3$–$C_{30}$ alkyl dianhydrides, aromatic acids (benzoic acid), acidic clays, maleic acid, anhydride copolymer, and p-toluene sulfonic acid, with benzoic acid being preferred.

The loading of the acid or mud anhydride in the rubber granules may be within the ranges described above.

EXPERIMENTS

Example 1

Granules comprising a rubber matrix with breaker particles dispersed therein were made with the following materials:

| EPDM[1] | Mooney viscosity (ML 1 + 4 125° C.) of 69 |
|---|---|
|  | S.G. of 0.86 |
|  | MW (wt. avg.) 290,000 |
|  | Broad MW distribution |
|  | ethylene/propylene/5-ethylidene-2-norbornene |
|  | 61/35/4 wt % |
|  | amorphous |
|  | glass transition - 60° C. |
| PIB[2] | MW (wt. avg.) 392 |
| Ca(OH)$_2$ | Powder |

[1]obtained from DuPont
[2]obtained from Soltex, Inc.

The EPDM was mixed with a mixture of Ca(OH)$_2$ and PIB in a Brabender Plasticorder. The total charge to the Plasticorder was:

| EPDM | 45.0 gr. (80 wt %) |
|---|---|
| PIB | 3.7 gr. (7 wt %) |
| Ca(OH)$_2$ | 7.3 qr. (13 wt %) |
|  | 56.0 gr. |

The Ca(OH)$_2$ and the PIB were added as a mixture to the Plasticorder. The mixing was for four minutes at 70° C. Following the mixing step the material was removed from the Plasticorder as mass with the Ca(OH)$_2$ powder dispersed uniformly therein. The mass was ground on a lab grinder producing granules of about 50 mesh. The granules were non-tacky and free flowing.

Example 2

Gelation Procedure and Controlled Break

A gelled hydrocarbon was prepared as follows:

(a) 198 mls of red diesel oil and 2.0 mls (1%) of deionized water were placed in a blender container;

(b) 1.40 mls of a $C_8$ to $C_{10}$ phosphate diester[1] was slowly added to the container with slow stirring;

[1]Marketed by NALCO/EXXON as ASP-160, Modification No. 2

(c) 0.21 mls of 45 wt % aqueous sodium aluminate was added dropwise to the container, followed by high stirring for 3 minutes;

(d) at the end of the 3 minutes of rapid stirring, 0.50 gr. of the granules prepared in accordance with Example 1 were added to the container (along with 1% water) and rapid stirring continued for 2 minutes.

Fifty-two mls of the contents of the blender were transferred to a Fann 50 viscometer. The viscometer was operated at 100 rpm, 100° F. for approximately 16 hours, with viscosities continuously recorded. The viscosity of the gelled oil at the beginning of the viscosity tests were 160° cps. After one hour the viscosity of the gelled oil began dropping and decreased gradually to about 20 cps at 16 hrs.

The delayed release granules compared with control runs as follows:

| Oil Viscosity | At Start Of Test | At End Of Test | Time |
|---|---|---|---|
| with breaker granules | 160 cps | 20 cps | 16 hrs. |
| with no breaker | 160 cps | 160 cps | 16 hrs. |
| with Ca(OH)$_2$[1] | 160 cps | 30 cps | 30 min. |

[1]Ca(OH)$_2$ powder added directly to oil. Same amount added as was contained in the granules.

Example 3

Granules were made in accordance with the procedure described in Example 1, except the ingredients were as follows:

| EPDM | 26.0 grams (Mooney viscosity 60) |
|---|---|
|  | (32 wt %) |
| Ca(OH)$_2$ | 55.5 grams 68 wt %) |
|  | 81.5 grams |

The granules had an average diameter of about 50 mesh and were free flowing and non-tacky.

Example 4

The granules prepared in Example 3 were tested by the procedure described in Example 2, except 2% of deionized water were added to the container along with the red diesel oil. The concentration of the granules was 1.0 pptg.

The results of this test and the control runs were s follows:

|  | At start Of Test | At End Of Test | Time |
|---|---|---|---|
| Oil Viscosity w/breaker granules | 150 cps | 20 cps | 10 hrs |

The above experiments demonstrate the effective delayed reaction of the granules containing the particulate breaker chemical. The results of Experiment 2 are particularly revealing:

(a) Powdered Ca(OH)$_2$ broke the gel almost immediately.

(b) The gel did not break without a breaker chemical.

(c) The granules delayed the breaking action of the Ca(OH)$_2$ for at least 16 hours.

What is claimed is:

1. In a method of fracturing a subterranean formation wherein a hydrocarbon liquid gelled with a pH sensitive alkyl phosphate ester gelling agent is pumped into the formation, the improvement wherein the hydrocarbon liquid has dispersed therein granules comprising:

(a) from 10 to 90 wt % of an oil degradable rubber, and (b) from 10 to 90 wt % of a particulate acid or base chemical dispersed in the rubber, said chemical being capable of breaking the alkyl phosphate gelling agent.

2. In a method of fracturing a subterranean formation wherein a hydrocarbon liquid gelled with a pH sensitive alkyl phosphate ester gelling agent is pumped into the formation, the improvement wherein the hydrocarbon liquid has dispersed therein granules comprising:

(a) from 10 to 90 wt % of an oil degradable rubber, and (b) from 10 to 90 wt % of a finely-divided base chemical dispersed in the rubber, said chemical being capable of breaking the alkyl phosphate ester gelling agent.

3. The method of claim 2 wherein the granules are 20 mesh or smaller.

4. The method of claim 2 wherein the rubber degrades as a result of dissolving or dispersing in the oil.

5. The method of claim 2 wherein the alkyl phosphate ester is a diester and the alkyl groups thereof each have from 6 to 10 carbon atoms.

6. The method of claim 2 wherein the amount of base chemical is such to degrade or destroy the gelled structure of the hydrocarbon and reduce its viscosity.

7. The method of claim 2 wherein the base chemical is selected from the group consisting of particulate Ca(OH)$_2$, NaHCO$_3$, urea, and Na$_2$CO$_3$ and mixtures thereof.

8. The method of claim 6 wherein the base chemical is powdered Ca(OH)$_2$.

9. The method of claim 2 wherein the rubber is selected from natural rubber, EPDM, PIB, SBR, EP Rubber, p-methyl styrene-isoprene, and mixtures thereof.

10. The method of claim 7 wherein the rubber is selected from the group consisting of EPDM having a molecular weight between 40,000 and 300,000, and PIB having a molecular weight between 100,000 and 2 million, and mixtures thereof.

11. The method of claim 2 wherein the granules comprise:

10 to 60 wt % of EPDM, and 40 to 90 wt % of Ca(OH)$_2$ powder.

12. The method of claim 2 wherein the rubber comprises a mixture of EPDM and PIB in weight ratio ranging from 1:1 to 20:1, said PIB having a molecular weight of 300 to 10,000.

13. The method of claim 2 wherein the base chemical is urea.

14. A method of fracturing a subterranean formation with an oil based fracturing fluid which comprises:

(a) gelling a liquid by adding an alkyl phosphate ester gelling agent to the hydrocarbon liquid;

(b) adding an aluminum compound to the liquid hydrocarbon to react with the gelling agent and form a salt of the alkyl phosphate ester which gels the hydrocarbon liquid;

(c) adding free flowing granules having an average particle size of 30 mesh or smaller to the hydrocarbon liquid, said granules comprising a matrix of an oil degradable rubber having dispersed therein a finely divided base compound capable of breaking the gelled structure of the salt of the alkyl phosphate ester;

(d) pumping the gelled hydrocarbon liquid containing the granules into the formation at a rate and pressure sufficient to form a fracture therein;

(e) shutting in the well whereby the hydrocarbon liquid degrades a portion at least of the rubber matrix releasing the base chemical to react with the salt of the alkyl phosphate ester and reduce the viscosity of the gelled hydrocarbon liquid.

15. The method of claim 14 wherein the delayed release of the base chemical commences at a time period not less than 1 hour after introduction into the liquid hydrocarbon and extends for a period in excess of 10 hours after introduction into the liquid hydrocarbon.

16. The method of claim 14 wherein the granules degrade by being dissolved in the presence of oil.

17. The method of claim 14 wherein the rubbers are classified as AA by ASTM D2000-SAE J200.

* * * * *